(12) United States Patent
Foti

(10) Patent No.: US 8,762,549 B2
(45) Date of Patent: Jun. 24, 2014

(54) SYSTEM AND METHOD FOR IPTV NODE RECOVERY

(75) Inventor: George Foti, Dollard-des-Ormeaux (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 749 days.

(21) Appl. No.: 12/965,363

(22) Filed: Dec. 10, 2010

(65) Prior Publication Data

US 2011/0179460 A1    Jul. 21, 2011

Related U.S. Application Data

(60) Provisional application No. 61/295,909, filed on Jan. 18, 2010.

(51) Int. Cl.
    *G06F 15/16* (2006.01)
(52) U.S. Cl.
    USPC ............................. 709/228; 709/222; 709/227
(58) Field of Classification Search
    USPC ............................................ 709/222, 227–228
    See application file for complete search history.

(56) References Cited

U.S. PATENT DOCUMENTS

| | | | | |
|---|---|---|---|---|
| 7,289,429 | B2 * | 10/2007 | Mo et al. ..................... | 370/217 |
| 2003/0040280 | A1 | 2/2003 | Koskelainen | |
| 2006/0149847 | A1 | 7/2006 | Meskauskas et al. | |
| 2007/0130346 | A1 | 6/2007 | Xie et al. | |
| 2007/0242659 | A1 * | 10/2007 | Cantu et al. .................. | 370/352 |
| 2007/0275710 | A1 * | 11/2007 | Mayer et al. .................. | 455/423 |
| 2008/0056121 | A1 * | 3/2008 | Tsai et al. ..................... | 370/216 |
| 2008/0098255 | A1 | 4/2008 | Tagane | |
| 2008/0109853 | A1 * | 5/2008 | Einarsson et al. ............. | 725/62 |
| 2008/0151918 | A1 | 6/2008 | Foti | |
| 2009/0031016 | A1 | 1/2009 | Nakai | |
| 2009/0049489 | A1 * | 2/2009 | Kure ............................. | 725/93 |
| 2009/0119404 | A1 * | 5/2009 | Kaura et al. .................. | 709/226 |
| 2009/0164642 | A1 * | 6/2009 | Foti .............................. | 709/227 |
| 2009/0210743 | A1 * | 8/2009 | Gu et al. ....................... | 714/15 |
| 2009/0222874 | A1 * | 9/2009 | White et al. .................. | 725/118 |
| 2010/0150123 | A1 * | 6/2010 | Kim et al. ..................... | 370/338 |
| 2010/0177767 | A1 * | 7/2010 | Ishii .............................. | 370/352 |
| 2010/0254370 | A1 * | 10/2010 | Jana et al. ..................... | 370/352 |

FOREIGN PATENT DOCUMENTS

| | | |
|---|---|---|
| EP | 2099156 A1 | 9/2009 |
| WO | 03/039186 A1 | 5/2003 |

OTHER PUBLICATIONS

International Search Report from corresponding application PCT/IB2011/050221.
OIPF Release 1 Specification Profiles, V1.0—Oct. 8, 2009, pp. 1-33.

* cited by examiner

*Primary Examiner* — David Lazaro
*Assistant Examiner* — Sarah Drabik
(74) *Attorney, Agent, or Firm* — David J Rahmer; Ericsson Canada Inc.

(57) ABSTRACT

A system and method for failure recovery for a node in an IPTV network makes use of the ability of an IMS Gateway, an Open IPTV Terminal Function, and an IPTV Control Server to provide each other with information about a session to be recovered in a manner which allows the control session state to be reconstructed without impacting the user's viewing experience.

19 Claims, 5 Drawing Sheets

SYSTEM AND METHOD FOR IPTV NODE RECOVERY

RELATED APPLICATION

The present application is related to, and claims priority from, U.S. Provisional Patent Application No. 61/295,909, filed Jan. 18, 2010, entitled "System and Method For IPTV Terminating Node Recovery", the disclosure of which is incorporated herein by reference.

TECHNICAL FIELD

The present invention relates generally to procedures and mechanisms for node recovery.

BACKGROUND

In the past, television programming was originally broadcast to viewer's television sets through a radio wave transmission in a defined frequency band referred to as a channel, transmitted from a broadcast tower and received by antennas located at a home. As technology progressed, these broadcast signals were retransmitted over a common access cable infrastructure to the home.

As technology has provided new or improved delivery mechanisms, they have been employed to allow for improved or enhanced television experiences. With the arrival of packet based data networks, and the processing power to properly encode and decode video data at sufficiently high frame rates, Internet Protocol TV (IPTV) is becoming more accessible. IPTV employs a packed based delivery network where infrastructure elements are employed to verify that a given use is authorized to access content before the requested content is delivered to the user.

In packet based networks, broadcasting data is not typically done. Instead data is either sent to a specific node (unicast) or sent to a plurality of nodes (multicast). Many users can join a multicast session, and from the user perspective, this may not show any differences from a conventional broadcast.

In conventional IPTV environments, the network is built upon an Internet Multimedia Subsystem (IMS), an architectural framework which uses a plurality of Internet Protocols (IP) for delivering IP multimedia services to a user. The IMS network employs Session Initiation Protocol (SIP) as a control channel protocol. SIP commands are employed to provide control over the initiation and termination of sessions. The packets containing the actual video content are not delivered through the control session, but instead are delivered in the content delivery session using another protocol such as the Real-time Transport Protocol (RTP).

Reference is now made to FIG. 1a (prior art). In an exemplary IPTV network 100, one or more Open IPTV Terminal Function (OITF) devices, which are often provided in the form of Set Top Boxes (STB), are connected to an IP network via an IMS Gateway (IG) 104 and an access router (not shown). For simplicity, only one OITF device 102 is shown in this example.

It should be understood that an OITF 102, as with many other nodes in an IPTV network, is a device that performs a number of different functions and can be implemented in either dedicated hardware as is typically the case in an STB, or on a general purpose computer. Some components of the device are dedicated to decoding the audio and video data, leaving administration of the network functionality to other components of the device. This is often described by referring to the device as having a data plane and a control plane.

Typically a SIP session is used to create a control session, which in turn, is used to create a content delivery session between a Content Source 108 and an OITF. A SIP session 106b is established between OITF 102 and the IG 104, and an associated SIP session 106a is established between the IG 104 and the IPTV Control Server (IPTV CS) 110, which is used to invoke and tear down RTP sessions, as well to perform other management functions. An RTP session 112 is established between the OITF 102 and the Content Source 108. Note that the IG 104 is acting as a Back to Back User Agent (B2BUA) between the two associated control sessions 106a and 106b that form a single virtual session. Those skilled in the art will appreciate that for the sake of brevity this may be referred to simply as a control session. Alternatively, an HTTP session may be established between the OITF 102 and the IG 104, in lieu of the SIP session 106b. In this case, the IG 104 would still use a SIP session with the IPTV CS and handle all the necessary inter-working between the associated HTTP and SIP control sessions.

At present, there is no mechanism supported by an open standard group in the IPTV space, such as the Open IPTV Forum, that provides for a graceful recovery procedure to allow a node to recover from a failure. An OITF or an IG that experience a failure cannot perform a restart or other recovery mechanism without adversely impacting the user's experience (i.e. a disruption to the user's viewing occurs).

Reference is now made to FIG. 1b (prior art), which shows an existing method for restarting an IG 104. Following a control session failure 116, software fault, or other type of failure, the IG performs a restart 118. All user and session data is cleared from the IG, and the session state is lost 120, even though a content delivery session may still be active between the OITF and the content source. In order to re-establish a control session, the content delivery session must also be terminated and restarted, as the delivery session is managed by (i.e. initiated, modified, terminated) and associated with the control session.

Accordingly, it should be readily appreciated that in order to overcome the deficiencies and shortcomings of the existing solutions, it would be advantageous to have a solution for gracefully recovering from errors and failures without impacting the user.

SUMMARY

It is an object of the present invention to obviate or mitigate at least one disadvantage of the prior art.

In a first aspect of the present invention, there is provided a method for reconstructing a session state following a control session failure by a node in an IPTV network. The method comprises the steps of requesting user identity registration information and session information from another external node, which is participating in the control session; receiving the user identity registration information and session information from the external participating node; and creating the session state using the received user identity registration information and session information.

In an exemplary embodiment of the first aspect of the present invention, the node experiencing the control plane failure may be an IMS Gateway (IG) and the external node participating in the control session may be an IPTV Control Server (IPTV CS). The IG sends a request to the IPTV CS to return user identity registration information and session information. The IG receives the requested information from the IPTV CS and uses the received information to create a control session state.

In a further embodiment, the step of requesting user identity registration information and session information is preceded by the IG obtaining a user identity that is subscribed in the IPTV household network. The user identity may be obtained from an internal memory of the IG, or from an external node such as the IPTV CS, or from another source. The IG may alternatively obtain a list of all the user identities subscribed in the IPTV household network, prior to the step of requesting user identity registration information and session information.

In a further embodiment, the step of requesting the user identity registration information and session information may include sending a SIP SUBSCRIBE message to the external node participating in the control session. The SIP SUBSCRIBE message may include a request for user identity registration information. The step of receiving may include receiving a SIP NOTIFY message from the external node participating in the control session. The SIP NOTIFY message may include user identity registration information. The user identity registration information may be a confirmation or an indication that a user identity is a registered user identity. A subsequent SIP SUBSCRIBE message may be sent, including a request for session information related to a registered user identity. A SIP NOTIFY message may be returned, including session information related to all sessions the registered user identity is engaged in. This includes the session identity, the called party, etc. If the registered user identity is not engaged in any session, the SIP NOTIFY message will preferably indicate that as well.

In a further embodiment, the steps of requesting and receiving user identity registration information and session information, and creating the session state may be repeated for every user identity in the IPTV household network.

In another exemplary embodiment of the first aspect of the present invention, the node experiencing the control plane failure may be an IG and the external node participating in the control session may be an OITF. The IG sends a request to the OITF to return user identity registration information and session information. The IG receives the requested user identity registration and session information from the OITF and uses the received information to create a control session state.

In a further embodiment, the step of requesting user identity registration information and session information is preceded by the IG obtaining the device Uniform Resource Locator (URL) of an OITF connected to the IG in a residential IPTV Network. The IG may broadcast an OITF Device Discovery Request message and receive the device URL of an OITF in response. The IG may alternatively obtain device URLs for all OITF devices in the residential IPTV local area network (LAN), prior to the step of requesting user identity registration information and session information.

In a further embodiment, the step of requesting may include sending an HTTP GET message to a device URL of an OITF. The HTTP GET message may include a request for user identity registration information and session information associated with that OITF. The step of receiving may include receiving an HTTP OK 200 response from the OITF, the body of the HTTP OK 200 message including the user identity registration information and session information associated with that OITF.

In a further embodiment, the steps of requesting and receiving user identity registration information and session information, and creating the session state may be repeated for each OITF device connected to the residential IPTV LAN.

In another exemplary embodiment of the first aspect of the present invention, the steps of requesting and receiving user identity registration information and session information may involve multiple external nodes participating in the control session. The user identity registration information may be received from a first external participating node and the session information may be received from a second external participating node. For example, the user identity registration information may be received from an IPTV CS and the session information may be received from an OITF. Or alternatively, the user identity registration information may be received from an OITF and the session information may be received from an IPTV CS.

In a second aspect of the present invention, there is provided a node in an IPTV network. The node comprises a processor, a communication interface, and an instruction repository. The processor receives instructions to cause the communication interface to request user identity registration information and session information from an external node participating in a control session. In response to the request, the communication interface receives the user identity registration information and session information, and uses the received information to create a control session state.

One skilled in the art will appreciate that failure and recovery of an IG can occur without the user experiencing a disruption to their viewing so long as the recovery is performed quickly, and in the course of the recovery, the IG does not force the OITF or any other node to suspend the displaying of the content stream.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1A:
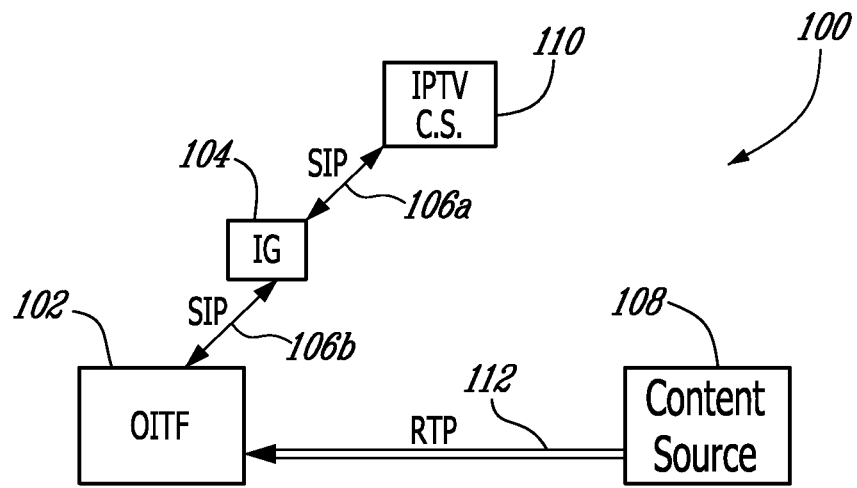
FIG. 1a illustrates a prior art IPTV network.
Figure 1B:
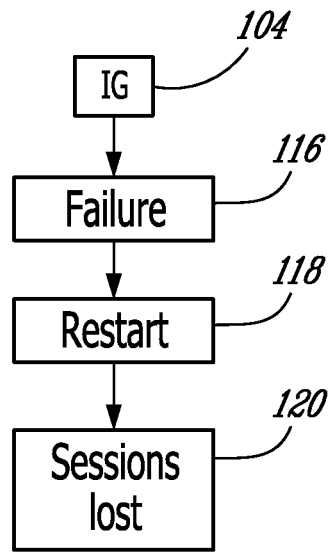
FIG. 1b illustrates a prior art method for restarting an IG.

The innovative teachings of the present invention will be described with particular reference to various exemplary embodiments. However, it should be understood that these embodiments provide only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several figures.

The present invention is generally directed to a system and method for nodes to gracefully recover from failures in an IPTV network. Below are presented several different options for recovery of an IG. First a network-centric approach will be described; secondly, an approach that uses only the residential LAN of the IG will be described; and finally, a hybrid method that combines both approaches will be illustrated.

From the perspective of the IG, only control session data traverses the IG, while the actual content used to provide video and audio to the user is delivered from the content source to the OITF through a different path. When a failure occurs on the control plane but content is still arriving, a graceful recovery process for the IG which does not require the termination of the associated content delivery session(s) would allow for a seamless recovery of the control session state that is transparent to the user and does not cause interruption of the service.

Figure 2A:
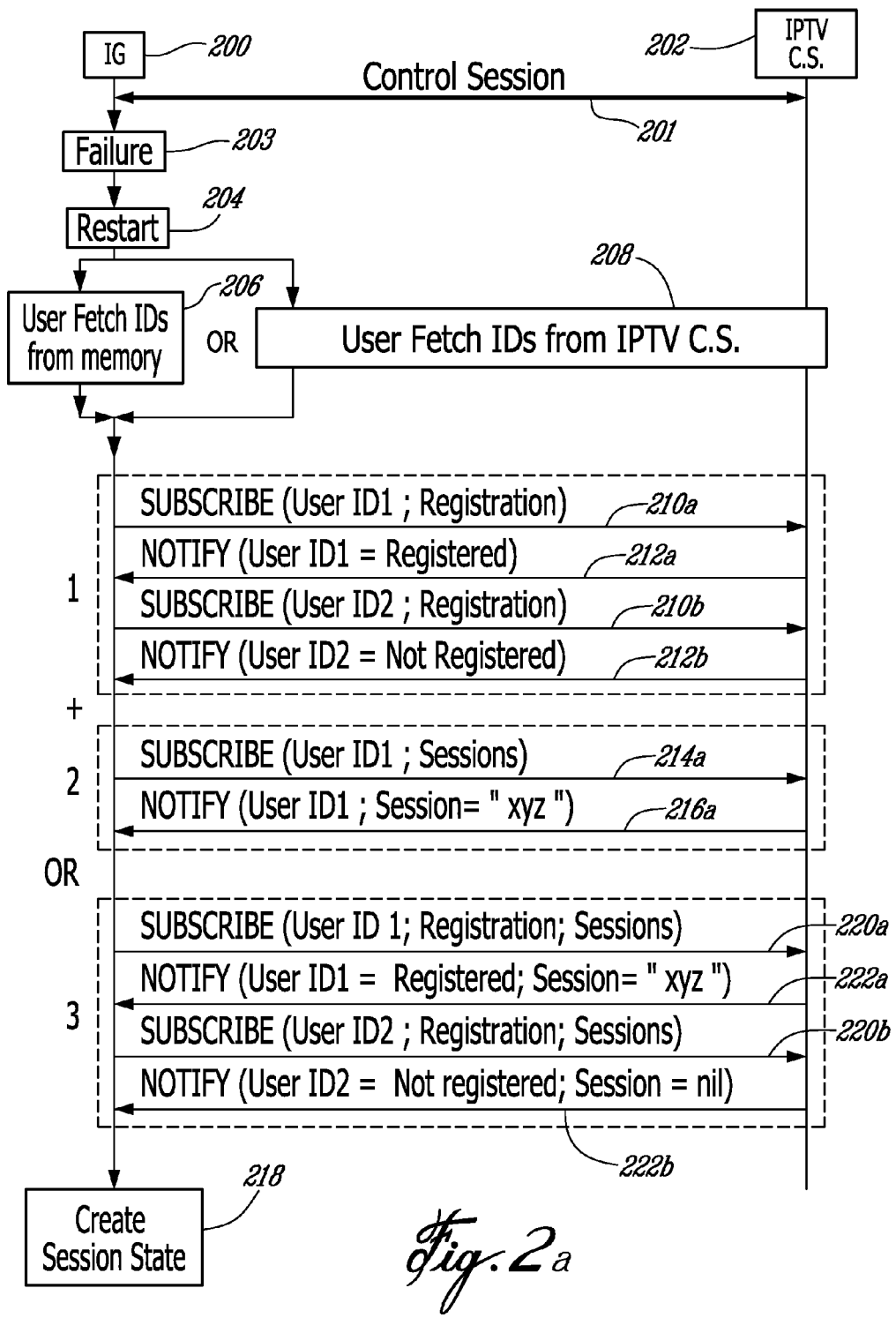
FIG. 2a is a signal flow illustrating a recovery process for an IG.

FIG. 2a illustrates the signal flow for a network-centric recovery process for an IG 200 of the present invention. The IG 200 and the IPTV CS 202 are engaged in a control session 201, associated with an ongoing content delivery session (not shown). When the IG 200 experiences a failure 203 and restarts 204, it completes its start-up procedure without tearing down any of the established control sessions prior to the restart, and retrieves all user identities, also known as IMS Multimedia Public Identities (IMPUs), for the household subscription. This information may be cached in the IG, or it can be retrieved from the IPTV network. As such, the user identities may be retrieved from the internal memory of the IG 200 as illustrated in step 206, or alternatively, the user identities may be retrieved from the IPTV CS 202 as illustrated in step 208. The step of retrieving the user identities can be alternatively be included as part of the IG's restart procedure. For exemplary purposes of FIG. 2a, UserID1 and UserID2 will be considered as the user identities retrieved for the household subscription.

For each user identity retrieved, the IG 200 connects to the IPTV CS 202 to subscribe to the SIP registration event package for that user. This subscription allows the IG 200 to receive a notification that indicates whether the user identity is currently a registered user (i.e. registered in the IMS network), or not. A SIP SUBSCRIBE message 210a is sent from the IG 200 to the IPTV CS 202 to subscribe to the SIP registration event package for user identity UserID1. Responsive thereto, a SIP NOTIFY message 212a is returned from the IPTV CS 202 to the IG 200, including a notification or an indicator that UserID1 is a registered user identity.

Similarly, a SIP SUBSCRIBE message 210b is sent from the IG 200 to the IPTV CS 202, to subscribe to the SIP registration event package for user identity UserID2. A SIP NOTIFY message 212b is returned from the IPTV CS 202 to the IG 200, including a notification that UserID2 is not a registered user identity. The steps 210, 212 may be repeated for each user identity retrieved.

If the user identity is registered in the IMS network, the IG 200 then proceeds to subscribe with the IPTV CS 202 to the SIP dialog event package for that registered user identity. The subscription to the SIP dialog event package allows the IG 200 to be notified of all IPTV related dialogs, or sessions, the user is currently engaged in. The SIP dialog event package will also indicate if the registered user is not engaged in any sessions. A SIP SUBSCRIBE message 214a is sent from the IG 200 to the IPTV CS 202, to subscribe to the SIP dialog event package for UserID1. A SIP NOTIFY message 216a is returned from the IPTV CS 202 to the IG 200, including session information for all sessions UserID1 is a participant in. The session information includes the session identity, the called party, and other information pertinent to the SIP session the user is engaged in.

It will be apparent to one skilled in the art that in the exemplary method of FIG. 2a, steps 214 and 216 were not repeated for UserID2 as SIP NOTIFY message 212b indicated UserID2 was not a registered user identity.

The IG 200 is then able to create a complete state for user identity UserID1 using the registration and session information, in step 218. Creating the state includes restoring all information lost during the restart (i.e. the user registration and session information) to its state prior to the failure and restart.

In an alternative embodiment of FIG. 2a, the steps of subscribing to a registration event package and a dialog event package may be combined into a single step, so long as there is an event package which will permit that subscription. A SIP SUBSCRIBE message 220a is sent from the IG 200 to the IPTV CS 202, to subscribe to an event package which notifies the requestor if UserID1 is registered or not and, if UserID1 is registered, returns session information for all sessions UserID1 is engaged in, if any. SIP NOTIFY message 222a is returned from the IPTV CS 202 to the IG 200, including a notification that UserID1 is a registered user identity, and session information for all sessions UserID1 is engaged in. The IG 200 is then able to create a complete state for user identity UserID1 using the registration and session information, in step 218. It will be apparent to one skilled in the art that steps of sending SIP SUBSCRIBE 220b and receiving SIP NOTIFY 222b are similarly repeated for UserID2.

Figure 2B:
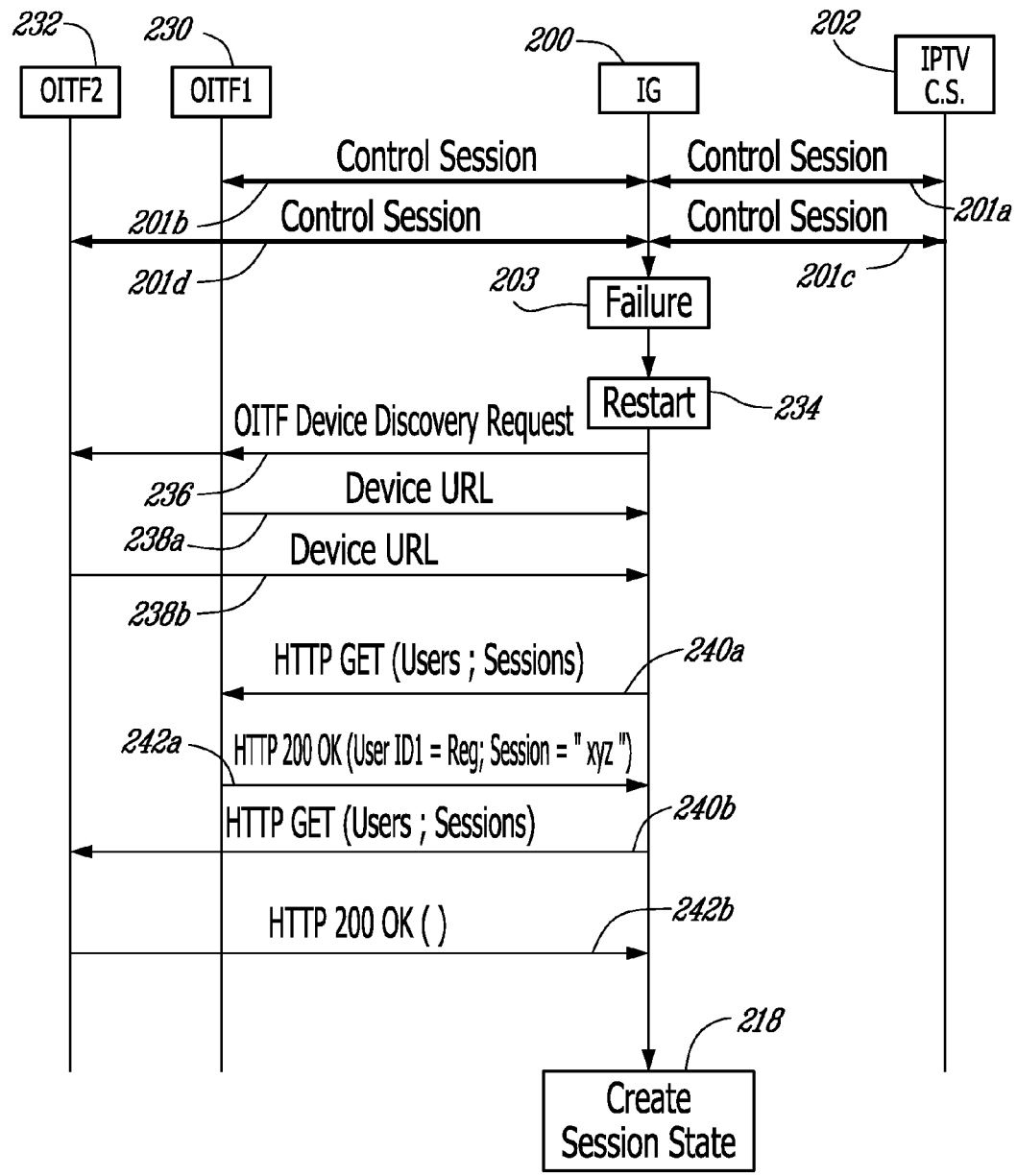
FIG. 2b is a signal flow illustrating a recovery process for an IG.

FIG. 2b illustrates the signal flow for a recovery process of the present invention that only involves the residential IPTV LAN that the IG is connected to. For exemplary purposes of FIG. 2b, OITF1 230 and OITF2 232 will be considered the OITF devices in the residential LAN. The IG 200 is engaged in a control session 201a with the IPTV CS 202 and an associated control session 201b with OITF1 230. Similarly, IG 200 is engaged in a control session 201c with the IPTV CS 202 and an associated control session 201d with OITF2 232.

When the IG 200 experiences a failure 203 and restarts 234, it completes its start-up procedure without tearing down any of the established control sessions prior to the restart, and broadcasts an OITF target device discovery request 236. This request may be sent over the multicast channel in the residential LAN, preferably using standard Universal Plug and Play (UPnP) procedures. Each OITF on the LAN responds with its own device URL. OITF1 230 sends its device URL 238a to the IG 200, and OITF2 232 sends its device URL 238b to the IG 200.

Using the device URL, the IG can then transmit to each responding OITF an HTTP GET request. The HTTP GET allows the IG to request information for any registered user identity on the OITF and all IPTV session information related to the registered user identity on that OITF. HTTP GET message 240a is sent to OITF1 230, and HTTP GET message 240b is sent to OITF2 232.

In response, each OITF device contacted by the IG 200 returns an HTTP 200 OK response, and can provide the requested information in the body of the response. The information is preferably provided in an XML format, though other formats may be used without departing from the scope of the present invention. HTTP 200 OK message 242a is sent from OITF1 230 to the IG 200 and includes registered user identity UserID1 and the related session information for UserID1 on OITF1 230, if any. Session information may include session identity, called party and all pertinent information about the session. Similarly, HTTP 200 OK 242b returns the registered user identity and related session information for OITF2 232.

The IG 200 is then able to construct a complete state for OITF1 230 and OITF2 232 using the user registration and session information, in step 218.

Figure 2C:
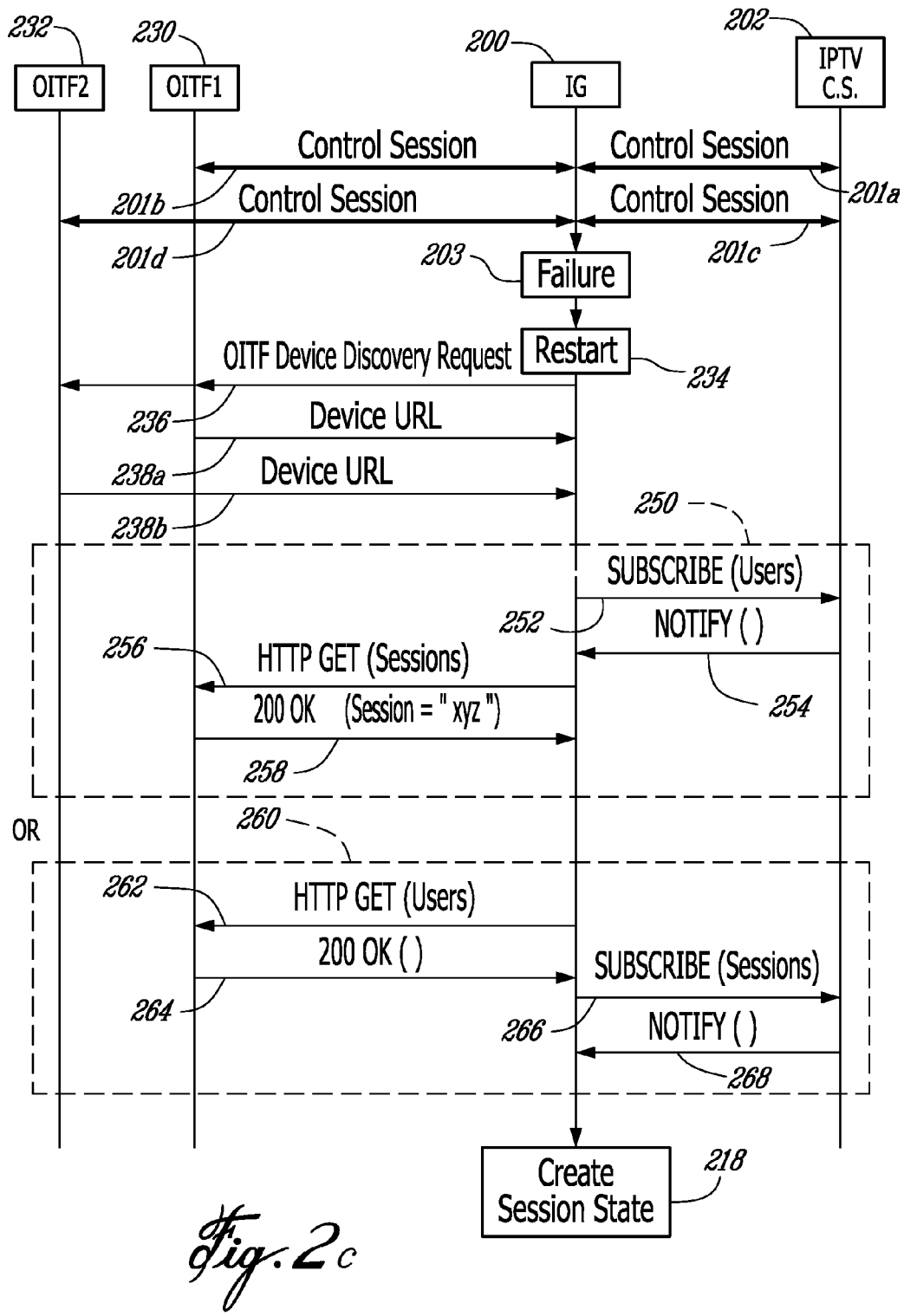
FIG. 2c is a signal flow illustrating a recovery process for an IG.

FIG. 2c illustrates the signal flow for an IG recovery process of the present invention that uses a hybrid approach, contacting both an IPTV CS in the IPTV network and an OITF in the residential LAN to request information. The IG 200 is engaged in a control session 201a with the IPTV CS 202 and an associated control session 201b with OITF1 230. Similarly, IG 200 is engaged in a control session 201c with the IPTV CS 202 and an associated control session 201d with OITF2 232. The IG 200 experiences a failure 203 and as part of its restart procedure 234, the IG 200 retrieves all user identities for the household subscription, identical to steps 206 or 208 in FIG. 2a. UserID1 will be used as an exemplary user identity for FIG. 2c.

The IG 200 broadcasts an OITF Device Discovery Request 236, and receives the device URLs 238a and 238b from each OITF in the LAN. Steps 236 and 238 are identical to those steps in FIG. 2b, and will not be described in detail.

In an embodiment of the hybrid recovery approach 250, the user identity registration information is received from an IPTV CS and the session information is received from an OITF. A SIP SUBSCRIBE message 252 is sent from the IG 200 to the IPTV CS 202 to subscribe to the SIP registration event package for user identity UserID1. A SIP NOTIFY message 254 is returned from the IPTV CS 202 to the IG 200, including an indication that UserID1 is a registered user identity, or not a registered user identity. It will be apparent to one skilled in the art that steps 252 and 254 may be repeated for each user identity in the residential network. The IG 200 also sends an HTTP GET 256 to OITF1 230, including a request for session information related to users in the residential network registered on OITF1 and engaged in sessions. HTTP 200 OK 258 is returned, including the session information. It will be apparent to one skilled in the art that steps 256 and 258 may be repeated for each OITF device in the residential LAN. The IG 200 is then able to construct a complete state 218 using the received user registration and session information.

In a further embodiment of the hybrid recovery approach 260, the user identity registration information is received from an OITF and the session information is received from an IPTV CS. The IG 200 sends an HTTP GET 262 to the device URL of OITF1 230, including a request for information for any registered user identity on that OITF. An HTTP 200 OK 264 is returned, including the registered user information. It will be apparent to one skilled in the art that steps 262 and 264 can be repeated for each OITF in the residential network. The IG 200 also sends a SIP SUBSCRIBE 266 to the IPTV CS 202, to subscribe to the SIP dialog event package for UserID1. SIP NOTIFY 268 is returned, including session information for all sessions UserID1 is a participant in. It will be apparent to one skilled in the art that steps 266 and 268 can be repeated for each user identity in the residential network. The IG 200 is then able to create a complete state 218 using the received user registration and session information.

Figure 3:
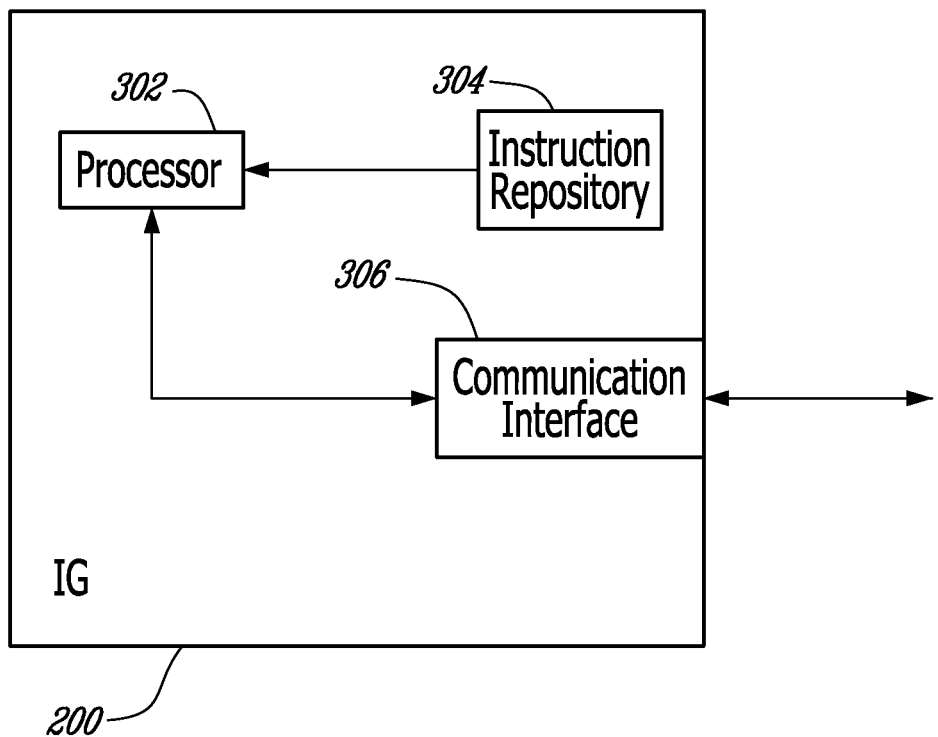
FIG. 3 illustrates an IG according to an embodiment of the present invention.

FIG. 3 illustrates a block diagram embodiment of an IG 200 of the present invention. The IG 200 includes a processor 302 which controls and interacts with a communication interface 306. An instruction repository 304 stores instructions to be executed by the processor 302. The processor 302 instructs the communication interface 306 to request, from an external node participating in a control session, user identity registration information and session information, as described herein with respect to FIGS. 2a, 2b and 2c. The communication interface 306 receives, from a participating external node, the user identity registration information and the session information. The communication interface 306 can send and receive SIP messages and/or HTTP messages that are then acted upon by the processor 302. The processor 302 uses the received user identity registration information and the received session information to create a session state. The IG 200 may implement any of the methods of the present invention as described in FIGS. 2a, 2b and 2c. One skilled in the art will appreciate that in implementation, the functions of the processor 302 can be provided by general purpose processors, or task specific processors, that execute instructions stored in the instruction repository 304 that enable the above described functionality. The communication interface 306 can be implemented through a single network connection, or multiple network connections using standard network interfaces and being controlled by the processor 302.

Based upon the foregoing, it should now be apparent to those of ordinary skill in the art that the present invention provides an advantageous solution. Although the system and method of the present invention have been described with particular reference to certain type of messages and nodes, it should be realized upon reference hereto that the innovative teachings contained herein are not necessarily limited thereto and may be implemented advantageously in various manners. It is believed that the operation and construction of the present invention will be apparent from the foregoing description.

Embodiments of the invention may be represented as a software product stored in a machine-readable medium (also referred to as a computer-readable medium, a processor-readable medium, or a computer-usable medium having a computer-readable program code embodied therein). The machine-readable medium may be any suitable tangible medium including a magnetic, optical, or electrical storage medium including a diskette, compact disk read only memory (CD-ROM), digital versatile disc read only memory (DVD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those skilled in the art without departing from the scope of the invention, which is defined solely by the claims appended hereto.

What is claimed is:

1. A method for creating a session state following a control session failure by a node, comprising:
    sending a Session Initiation Protocol (SIP) subscribe message requesting, from at least one external node participating in the control session, at least one of a user identity registration information and a session information, the SIP subscribe message including a user identity;
    receiving, from the at least one external node participating in the control session, a SIP notify message including the at least one of the user identity registration information and the session information; and
    creating the session state using at least one of the user identity registration information and the received session information received from the at least one external node participating in the control session.

2. The method of claim 1, wherein the at least one participating external node is an IPTV Control Server.

3. The method of claim 2, wherein the at least one of the user identity registration information and the session information is received from the IPTV Control Server.

4. The method of claim 1 further comprising, prior to the step of sending the SIP subscribe message, obtaining the user identity from at least one of an internal memory of the node and an IPTV Control Server.

5. The method of claim 1, wherein the user identity registration information includes an indication that the user identity is a registered user identity.

6. The method of claim 1, wherein the at least one participating external node is an Open IPTV Terminal Function (OITF).

7. The method of claim 6, wherein the at least one of the user identity registration information and the session information is received from the OITF.

8. The method of claim 1, further comprising, prior to the step of sending the SIP subscribe message, obtaining a device Uniform Resource Locator (URL) from an OITF, wherein the device URL is used to request the at least one of a user identity registration information and a session information.

9. The method of claim 1, wherein the at least one participating external node comprises an IPTV Control Server and an OITF; the user identity registration information is received from the IPTV Control Server; and the session information is received from the OITF.

10. The method of claim 1, wherein the at least one participating external node comprises an IPTV Control Server and an OITF; the user identity registration information is received from the OITF; and the session information is received from the IPTV Control Server.

11. The method of claim 1, wherein the step of creating the session state includes restoring the user identity registration information and the session information to their state prior to the control session failure.

12. A method for creating a session state following a control session failure by a node, comprising:
sending a Hypertext Transfer Protocol (HTTP) GET message requesting, from at least one external node participating in the control session, at least one of a user identity registration information and a session information, the HTTP GET message including a user identity;
receiving, from the at least one external node participating in the control session, an HTTP 200 OK message including the at least one of the user identity registration information and the session information; and
creating the session state using at least one of the user identity registration information and the received session information received from the at least one external node participating in the control session.

13. A node in an IPTV network, comprising:
a processor;
a communication interface, operationally connected to the processor;
an instruction repository storing instructions that when executed by the processor cause the processor to instruct the communication interface to:
send a Session Initiation Protocol (SIP) subscribe message requesting, from at least one external node participating in a control session, at least one of a user identity registration information and a session information, the SIP subscribe message including a user identity;
wherein responsive to the request, the communication interface receives, from the at least one participating external node, a SIP notify message including the at least one of the user identity registration information and the session information; and
wherein the processor uses at least one of the received user identity registration information and the received session information to create a session state.

14. The node of claim 13, wherein the at least one participating external node is an IPTV Control Server, and the at least one of the user identity registration information and the session information is received from the IPTV Control Server.

15. The node of claim 13 further comprising, prior to sending the SIP subscribe message, obtaining the user identity from at least one of an internal memory of the node and an IPTV Control Server.

16. The node of claim 13, wherein the user identity registration information includes an indication that the user identity is a registered user identity.

17. The node of claim 13, wherein the at least one participating external node is an Open IPTV Terminal Function (OITF), and the at least one of the user identity registration information and the session information is received from the OITF.

18. The node of claim 13 further comprising, prior to sending the SIP subscribe message, the communication interface receiving a device Uniform Resource Locator (URL) from an OITF, wherein the device URL is used to request the at least one of a user identity registration information and a session information.

19. A node in an IPTV network, comprising:
a processor;
a communication interface, operationally connected to the processor;
an instruction repository storing instructions that when executed by the processor cause the processor to instruct the communication interface to:
send a Hypertext Transfer Protocol (HTTP) GET message requesting, from at least one external node participating in a control session, at least one of a user identity registration information and a session information, the HTTP GET message including a user identity;
wherein responsive to the request, the communication interface receives, from the at least one participating external node, an HTTP 200 OK message including the at least one of the user identity registration information and the session information; and
wherein the processor uses at least one of the received user identity registration information and the received session information to create a session state.

* * * * *